3,354,217
TRI(DIFLUORAMINO)METHYL BROMIDE
AND PROCESS OF PREPARATION
Charles D. Burton, Midland, Mich., assignor to The Dow
Chemical Company, Midland, Mich., a corporation of
Delaware
No Drawing. Filed Feb. 2, 1966, Ser. No. 524,971
7 Claims. (Cl. 260—583)

This invention relates to a novel organic fluorine nitrogen compound and more particularly is concerned with the novel compound tris(difluoramino)methyl bromide, $F_2NC(NF_2)_2Br$, and to a method for its preparation.

Tris(difluoramino)methyl bromide is suitable for use as anactive intermediate in preparing fluorine containing oxidizers employed in rocket propellant systems. In particular this novel compound finds utility in the production of stable solid oxidizers having low shock sensitivities.

Tris(difluoramino)methyl bromide has a melting point of about minus 20° C., being a white solid below this temperature. In the liquid state it is colorless. Its normal boiling point, calculated from vapor pressure measurements, is about 71° C. It possesses a unique infrared pattern. Nuclear magnetic resonance data and mass spectroscopy analytical results support the assigned structure.

This novel compound conveniently is produced by direct low temperature fluorination of perfluoroguanidine·hydrogen bromide adduct in liquid sulfur dioxide.

In actual preparation of the compound, perfluoroguanidine and hydrogen bromide in quantities ranging from about stoichiometric of that required for a 1:1 perfluoroguanidine·hydrogen bromide adduct to about 100 percent molar excess hydrogen bromide or more, ordinarily from stoichiometric to about a 25 percent molar excess and preferably about 10 to about 20 percent molar excess of hydrogen bromide, are reacted in liquid sulfur dioxide at a temperature of from about minus 80° C. to about minus 55° C., preferably at from about minus 65° to about minus 55° C. Ordinarily in preparing the adduct the reaction mixture is maintained at the reaction temperature for a period of from about 8 to about 24 hours or more. In this preparation usually at a minimum a molar raito of sulfur dioxide/perfluoroguanidine of about 1 is used. With mixtures lower in sulfur dioxide, marked reductions in yield are realized. The maximum quantity of sulfur dioxide carrier to be employed is not critical since excess of this solvent has no detrimental affect. Extremely large excesses of the sulfur dioxide vehicle generally are to be avoided in order that the reaction mixture does not become exceedingly dilute. Extremely dilute solutions, i.e. high mole ratios of sulfur dioxide/perfluoroguanidine, require large storage and transport equipment. Also, the rate of reaction may be slowed down in extremely dilute solutions.

Fluorine is introduced directly into the perfluoroguanidine·hydrogen bromide adduct containing sulfur dioxide solution while maintaining the reaction mass at a temperature of from about minus 50° C. to about minus 75° C., preferably at from about minus 55 to about minus 65° C. over a period of from about 60 minutes to about 120 minutes or more. The amount of fluorine employed at a minimum is that required to react with the adduct to give the novel compound of the present invention. Ordinarily, however, an excess of fluorine is employed as any portion of this reactant which does not enter into the reaction readily can be recovered and recycled for reuse. Conveniently fluorine is bubbled through the reaction mass or passed over the agitated surface of the perfluoroguanidine·hydrogen bromide adduct dissolved in the sulfur dioxide. Although fluorine can be used directly in the present process, desirably this reactant is employed in diluted form in admixture with an inert diluent gas, such as nitrogen or argon, for example. Nitrogen ordinarily is used because of its ready availability. The fluorine concentration in such gaseous mixtures generally is in the range of from about 1 to 50 volume percent. Ordinarily mixtures containing from about 20 to about 40 percent fluorine on a volume basis are used. This fluorine dilution range is not critical, however.

The reaction products are collected and the tris(difluoramino)methyl bromide recovered by distillation, codistillation, chromatography or other separation procedures. Fractional codistillation of the product mass followed by vapor phase chromatography provides an excellent means for recovering the compound.

The present process provides the following advantages; good yields of tris(difluoramino)methyl bromide are realized; no catalyst is required; and, both the intermediate perfluoroguanidine·hydrogen bromide adduct and tris(difluoramino)methyl bromide product are produced sequentially in the same reaction medium.

The present novel compound can be prepared in accordance with the present process using batch type or continuous operations. Reactors and process equipment to be employed are fabricated from those materials which are not detrimentally affected by the reactants or product materials and which have the requisite physical strength and desired structural characteristics as is understood by one skilled in the art. Stainless steel, nickel, nickel alloys and the like all are suitable materials of construction.

The following examples will serve to further illustrate the present invention but not meant to limit it thereto.

Example 1.—Into a 45 milliliter volume U-trap equipped with a magnetic stirring bar and at a temperature of about minus 140° C. were condensed about 0.87 gram (~13.5 millimoles) sulfur dioxide, about 0.2 gram (~1.3 millimoles) perfluoroguanidine and about 0.12 gram (~1.5 millimole) of anhydrous hydrogen bromide. The reaction mixture was then warmed to about minus 79° C. and held at this temperature for about 16 hours. The reduced pressure on the system was relieved with nitrogen and the sulfur dioxide solution of perfluoroguanidine·hydrogen bromide adduct warmed to about minus 60° C.

The 1:1 perfluoroguanidine·hydrogen bromide adduct was identified by its infrared spectrum and nuclear magnetic resonance spectrum. It appeared to be unstable at temperatures higher than the range of from about minus 50° C. to about minus 40° C.

A fluorine-nitrogen mixture containing about 33 percent by volume fluorine was passed at a total flow rate of about 125 milliliters per minute for a period of 120 minutes over the surface of the sulfur dioxide solution containing the perfluoroguanidine·hydrogen bromide adduct. During this time, the reaction mixture was continuously stirred. After the fluorination was complete, the system was purged with dry nitrogen while warming the U-trap reactor to about room temperature. The product mixture which vaporized from the reactor was transferred to a collection trap maintained at a temperature of about minus 140° C. The tris(difluoroamino)methyl bromide product was collected and recovered on an 18 foot siloxane chromatographic column. The yield of tris(difluoramino) methyl bromide, based on perfluoroguanidine reactant, was about 62 percent.

Identifying characteristics of the novel compound tris (difluoramino)methyl bromide as determined analytically are as follows:
(1) Vapor pressure:

| T, ° C. | V.P. mm. Hg |
|---|---|
| −20 | 16.2 |
| 0 | 51.5 |
| +19.9 | 118.7 |

(2) Boiling point, ~71° C. (calculated from vapor pressure determinations).
(3) Molecular weight: Found 240, calc. 248.
(4) $F^{19}$ nuclear magnetic resonance spectrum: One broad peak at —41.4 $\phi$ only.
(5) Mass spectrum:

| M/e | Abundance | Assignment |
|---|---|---|
| 195 | 48 | $(F_2N)_2Br$ |
| 176 | 1.2 | $F_2NCNFBr$ |
| 168 | 17.6 | $C(NF_2)_3$ |
| 162 | 0.78 | $F_2NCFBr$ |
| 157 | 2.8 | $F_2NCNBr$ |
| 143 | 24.6 | $F_2NCBr$ |
| 138 | 1.3 | $FNCNBr$ |
| 124 | 60.3 | $FNCBr$ |
| 112 | 11.3 | $FNBr$ |
| 105 | 11.3 | $CNBr$ |
| 97 | 34.5 | $F_2NCNF$ |
| 79 | 85 | $Br$ |
| 78 | 100 | $F_2NCN$ |
| 64 | 49.2 | $CNF$ |
| 52 | 55.1 | $NF_2$ |
| 50 | 24.4 | $CF_2$ |
| 33 | 37.8 | $NF$ |
| 31 | 50.5 | $CF$ |

(6) Infrared spectrum absorption: Absorption peaks at 9.35, 10.05 and 10.5 microns and a broad absorption band extending from 11.05 to 11.2 microns.

The analytical data support the assigned structure for tris(difluoramino)methyl bromide as shown directly hereinafter:

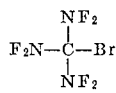

*Example 2.*—The procedure set forth for Example 1 was used in a number of separate runs wherein the fluorination was carried out at minus 55, minus 60 and minus 65° C. and fluorination times were varied from 60–120 minutes. In each of these studies tris(difluoramino)methyl bromide was recovered in high purity and good yields.

*Example 3.*—The procedure set forth in Example 1 was used in a number of studies employing various sulfur dioxide/perfluoroguanidine mole ratios and perfluoroguanidine·hydrogen bromide molar quantities. The data and results of these studies are summarized in Table 1.

TABLE 1

| Run No. | Mix Components | | | Tris(difluoramino) methyl Bromide Product Yield, Percent [3] | Remarks |
|---|---|---|---|---|---|
| | $SO_2$ | PFG [1] | HBr [2] | | |
| Control | 0 | 1 | 1.1 | 0 | 87% PFG recovered; some bromine produced. |
| 1 | 0.25 | 1 | 1.1 | 4 | Small amount of Freon 114 fluorocarbon added to provide fluidity in mix. |
| 2 | 0.5 | 1 | 1.1 | 4 | Do. |
| 3 | 1 | 1 | 1.1 | 22 | |
| 4 | 2 | 1 | 1.2 | 38 | |
| 5 | 3 | 1 | 1.2 | 43 | |
| 6 | 4 | 1 | 1.1 | 31 | |
| 7 | 5 | 1 | 1.0 | 43 | |
| 8 | 10 | 1 | 1.25 | 36 | |
| 9 | 5 | 1 | 1.5 | 39 | |
| 10 | 5 | 1 | 1.97 | 34 | |

[1] Perfluoroguanidine.
[2] Molar equivalent as based on HBr required for 1:1 PFG·HBr adduct.
[3] Based on PFG.

Various modifications can be made in the process for preparing the novel compound of the present invention without departing from the spirit or scope thereof for it is understood that I limit myself only as defined in the appended claims.

I claim:
1. Tris(difluoramino)methyl bromide.

2. A process for preparing tris(difluoramino)methyl bromide which comprises;
   (a) reacting perfluoroguanidine and hydrogen bromide in liquid sulfur dioxide at a temperature of from about minus 80° C. to about minus 55° C., the quantities of said perfluoroguanidine and hydrogen bromide at a minimum being about stoichiometric of that required for preparation of the 1:1 perfluoroguanidine·hydrogen bromide adduct;
   (b) introducing fluorine into the resulting sulfur dioxide solution containing the 1:1 perfluoroguanidine·hydrogen bromide adduct while maintaining the reaction mass at a temperature of from about minus 55 to about minus 75° C., the amount of fluorine at a minimum being that required to react with said adduct to provide tris(difluoramino)methyl bromide, and
   (c) separating said tris(difluoramino)methyl bromide from the reaction mass.

3. The process as defined in claim 2 wherein the reaction of said perfluoroguanidine and hydrogen bromide to prepare the corresponding 1:1 perfluoroguanidine hydrogen bromide adduct and the fluorination of said adduct to prepare tris(difluoramino)methyl bromide is caried out at a temperature of from about minus 55 to about minus 65° C.

4. The process as defined in claim 2 wherein hydrogen bromide at from about stoichiometric to about 25 percent molar excess of that required for formation of said perfluoroguanidine·hydrogen bromide adduct is employed.

5. The process as defined in claim 2 wherein hydrogen bromide at from about 10 to about 20 percent molar excess of that required for formation of said perfluoroguanidine·hydrogen bromide adduct is employed.

6. The process as defined in claim 2 wherein the mole ratio of sulfur dioxide to perfluoroguanidine at a minimum is about 1.

7. The process as defined in claim 2 wherein fluorine reactant is employed as a mixture of fluorine with an inert diluent gas, said mixture containing from about 20 to about 40 percent fluorine on a volume basis.

References Cited

UNITED STATES PATENTS 3,228,936  1/1966  Davis et al. _____ 260—249.6

CHARLES B. PARKER, *Primary Examiner.*

CARL D. QUARFORTH, L. A. SEBASTIAN, B. BILLIAN, *Examiners.*